US 6,573,708 B1

(12) United States Patent
Hiramatsu et al.

(10) Patent No.: US 6,573,708 B1
(45) Date of Patent: Jun. 3, 2003

(54) LINEAR DISPLACEMENT DETECTING STRUCTURE AND ELECTRONIC COMPONENT MOUNTING HEAD

(75) Inventors: Tooru Hiramatsu, Chofu (JP); Hiroyuki Kazehare, Chofu (JP); Kunihiko Iijima, Iida (JP)

(73) Assignee: Juki Corporation/Tamagawa Seiki Co., Ltd., Tokyo (JP)

( * ) Notice: Subject to any disclaimer, the term of this patent is extended or adjusted under 35 U.S.C. 154(b) by 0 days.

(21) Appl. No.: 10/081,454

(22) Filed: Feb. 21, 2002

(30) Foreign Application Priority Data

Feb. 22, 2001 (JP) ........................................ 2001-046074

(51) Int. Cl.[7] ................................................ G01B 7/14
(52) U.S. Cl. .............................. 324/207.17; 324/207.24
(58) Field of Search .................... 324/207.11, 207.13, 324/207.14, 207.15, 207.2–207.26, 262; 338/32 R, 32 H; 702/150, 151; 250/231.14, 231.18

(56) References Cited

U.S. PATENT DOCUMENTS

| 4,914,389 A | * | 4/1990 | Juds ...................... 324/207.21 |
| 4,951,048 A | * | 8/1990 | Ichikawa et al. ............. 341/15 |
| 5,779,367 A | * | 7/1998 | Obara ........................... 384/8 |

FOREIGN PATENT DOCUMENTS

JP          HEI 1-302101          12/1989

* cited by examiner

Primary Examiner—Jay Patidar
(74) Attorney, Agent, or Firm—Morgan & Finnegan, LLP (57) ABSTRACT

A linear displacement detecting structure 10 has a contact area 24 where a part of the periphery of a shaft 16 indirectly fits in/contacts a shaft hole member 14 through balls 34, and a non-contact area 26 where the other part of the periphery is spaced apart from the shaft hole member 14. A scale 20 is disposed in the non-contact area 26, and a sensor 22 is disposed in the vicinity of the shaft base member 14.

6 Claims, 7 Drawing Sheets

LINEAR DISPLACEMENT DETECTING STRUCTURE AND ELECTRONIC COMPONENT MOUNTING HEAD

BACKGROUND OF THE INVENTION

1. Field of the Invention

The invention relates to a linear displacement detecting structure and an electronic component mounting head including the linear displacement detecting structure.

2. Description of the Related Art

There has been known various linear displacement detecting structures, each structure including a shaft hole member having a shaft hole formed thereon, a shaft supported movably in its axis direction on the shaft hole member through the shaft hole, a scale moving with the shaft united, and a sensor for detecting the scale to determine the relative position in the axis direction between the shaft and the shaft hole member.

The shaft is slidable in the shaft hole member in the axis direction with spline fitting or the like.

A non-contact sensor, such as an optical sensor or magnetic sensor, is generally employed for detecting the scale.

The scale is formed by a number of fine grooves or magnetic thin film or the like arranged in a fine pitch along the axis direction. Abrasion of the scale may cause a degradation of the detecting precision by the sensor, and sometimes a detection failure. Therefore, the scale is usually arranged apart from the shaft hole member so as not to slide on to the shaft hole member.

Figure 10:
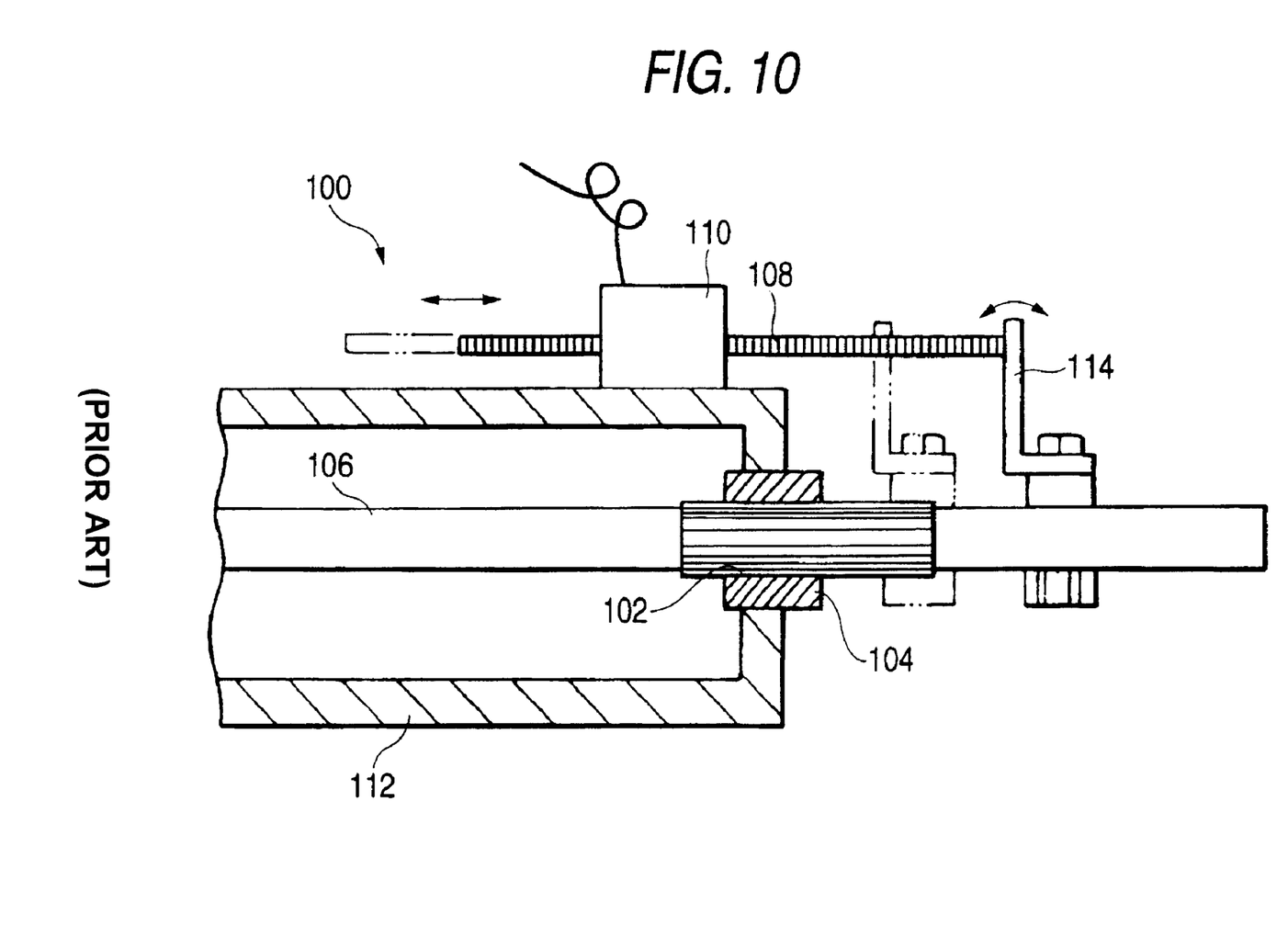
FIG. 10 is a side sectional view showing a conventional linear displacement detecting structure.

FIG. 10 shows an example of conventional linear displacement detecting structure.

The linear displacement detecting structure 100 includes a shaft hole member 104 having a shaft hole 102 formed thereon, a shaft 106 supported movably in its axis direction on the shaft hole member 104 through the shaft hole 102, a scale 108 moving with the shaft 106 united, a sensor 110 for detecting the scale 108, and a base 112 supporting the sensor 110 and the hole member 104.

The shaft 106 projects out from the end of cylindrical base 112 coaxial with the shaft, and protrudes or retracts in the axis direction.

The scale 108, facing the sensor 110, is a rod disposed in parallel with the shaft 106 in the vicinity of and along the periphery of the base 112, and has on the surface a number of fine grooves formed in the axis direction by a proper fine pitch.

One end of the scale 108 is fixed to the shaft 106 through a plate bracket 114 disposed perpendicular to (radial direction) the shaft 106.

The bracket 114 comes close to the base 112 when the shaft 106 is at the most retracted position. With such arrangement that the scale 108 and the bracket 114 are disposed close to the base 112, protruded amount of the scale and the like is restricted to be small-sized.

The sensor 110, a reflection-type photo-sensor, can detect the position of the scale 108 or the shaft 106 in the axis direction, sensing the grooves on the scale 108.

Since the sensor 110 detects the position of the shaft 106 indirectly through the scale 108 and the bracket 114, a detection error arises due to errors in fabricating and assembling the scale 108 and the bracket 114.

Since the scale 108 and the bracket 114 are required to be light weighted for cooperative movement with the shaft 106, it is difficult for them to have high rigidity. Their low rigidity causes the bracket 114 to pivotally swing around the mounting spot slightly, whereby the movement of the scale 108 does not synchronize with that of the shaft 106, resulting in a detection error of the sensor 110.

The shaft 106 may be extended to a protrusion direction to directly attach a scale to the extended portion with a sensor disposed near the extended portion. This structure can avoid the above-described detection error, as well as prevent the abrasion of the scale.

However, this extension of the shaft 106 is not preferable in view of installation space of the device because it makes the device longer in the axis direction.

For example, as JPA 2001-3008811 discloses, an electronic component mounting head having a linear displacement detecting structure needs compact size, avoiding long size in the axis direction.

SUMMARY OF THE INVENTION

It is an object of the invention to provide a linear displacement detecting structure in smaller size with higher detecting precision, and an electronic component mounting head having the linear displacement detecting structure.

In order to achieve the object mentioned above, the invention provides for a linear displacement detecting structure and an electronic component mounting head having the detecting structure. In a structure aspect, the invention includes a shaft hole member having a shaft hole formed thereon, a shaft supported movably in its axis direction on the shaft hole member through the shaft hole, a scale moving with the shaft united, and a sensor for detecting the scale to determine the relative position in the axis direction between the shaft and the shaft hole member. The structure has a contact area where a part of the periphery of the shaft fits in/contacts the shaft hole member directly or indirectly, and a non-contact area where the other part of the periphery is spaced apart from the shaft hole member. The scale is disposed in the non-contact area, and the sensor is disposed in the vicinity of the shaft hole member.

In a preferred embodiment, the shaft fits in the shaft hole member with a ball-spline mechanism.

In a particular arrangement, the structure may further include a bearing for supporting the shaft hole member rotatable around its axis so as to rotate the shaft united with the shaft hole member.

In a mounting head aspect, the mounting head includes the shaft hole member, a cylindrical shaft supported assembly in its axis direction on the shaft hole member through the shaft hole and having a component pick-up nozzle at the near top end for absorbing the component, the bearing, the scale, and the sensor. This structure detects the relative position in the axis direction between the shaft and the shaft hole member.

According to the invention, the relative position in the axis direction between the shaft and the shaft hole member can be detected in high precision.

DESCRIPTION OF THE PREFERRED EMBODIMENTS

Embodiments of the invention will now be explained in detail with reference to the accompanying drawings.

Figure 1:
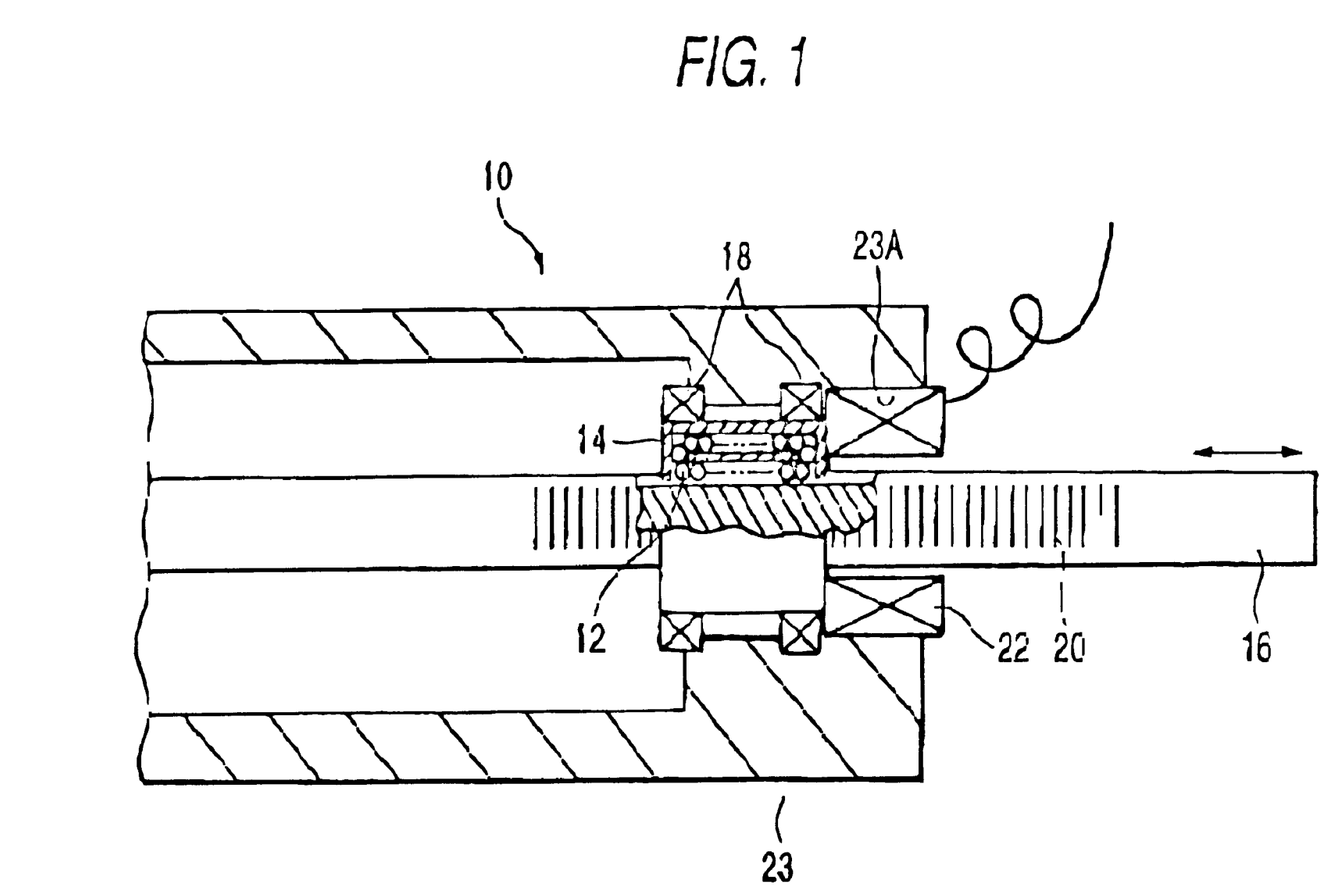
FIG. 1 is a side sectional view showing a linear displacement detecting structure according to a first embodiment of the invention.
Figure 2:
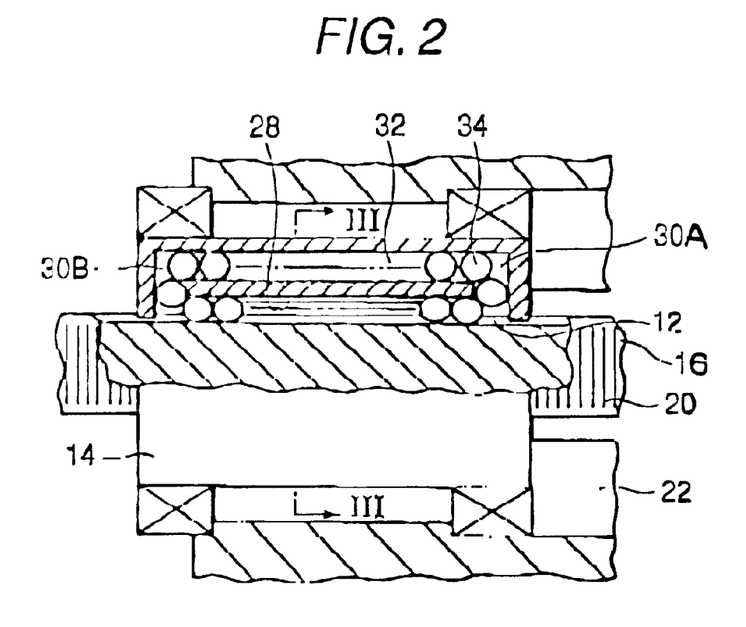
FIG. 2 is an enlarged side sectional view showing the surroundings of a shaft hole member of FIG. 1.
Figure 3:
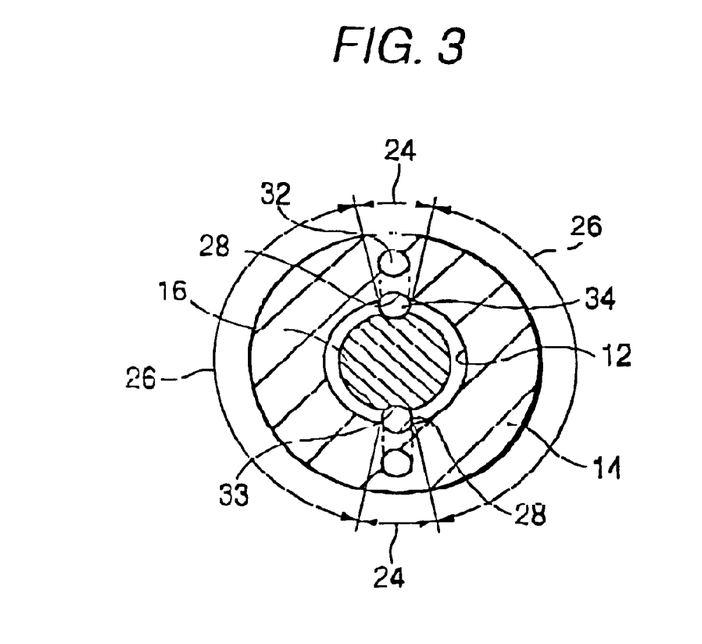
FIG. 3 is a cross-sectional view taken at the position marked III—III in FIG. 2.

As shown in FIGS. 1 to 3, a linear displacement detecting structure 10 includes a shaft hole member 14 having a shaft hole 12 formed thereon, a shaft 16 supported movably in its axis direction on the hole member 14 through the shaft hole 12, a bearing 10 supporting the hole member 14 rotatable around its axis, a scale 20 moving with the shaft 16 united, a sensor 22 for detecting the scale 20, and a base 23. The structure 10 detects the relative position in the axis direction between the shaft 16 and the hole member 14.

The structure 10 has a contact area 24 where a part of the periphery of the shaft 16 fits in/contacts the shaft hole member 14 directly or indirectly, and a non-contact area 26 where the other part of the periphery is spaced apart from the hole member 14. The scale 20 is disposed in the non-contact area 26, and the sensor 22 is disposed in the vicinity of the hole member 14.

The shaft hole member 14 is nearly a hollow cylinder, and the shaft hole 12 has a pair of U-shaped grooves 28 in the axis direction formed symmetrical about its center axis, and each U-shaped groove 28 shapes "U" on a cross-section as shown in the FIG. 3 which shows a cross-sectional view taken at the position marked III—III in FIG. 2.

Both ends of each of the grooves 28 in the axis direction are closed, and have respective connecting holes 30A and 30B formed radially outward.

Between radial outsides of the connecting holes 30A and 30B, receiving holes 32 are formed in the axis direction.

The shaft 16 is nearly a round bar with the outside diameter slightly smaller than the inside diameter of the shaft hole 12, and has on its circumference a pair of U-shaped grooves 33 in the axis direction formed symmetrical about its center axis.

A plurality of balls 34 are accommodated between these U-shaped grooves 33 and 28, and also in the connecting holes 30A and 30B and in the receiving holes 32. These balls circulate in chain-reaction in the order of grooves 28,33→hole 30A→hole 32→hole 30B or in the reverse order.

That is, the shaft 16 has the contact area 24 where the pair of U-shaped grooves 33 formed at the parts of circumference of the shaft 16 indirectly fit in/contact the shaft hole member 14 through the balls 34. With this arrangement, the shaft 16 is supported by the hole member 14, being slidable in the axis direction, and its relative rotation to the hole member 14 is restricted.

The other part of the circumference of the shaft 16 except the U shaped grooves 35 constitute the non-contact areas 26 spaced apart from the hole member 14.

The bearing 18 is a pair of ball bearings, the inside circumference of which is fitly attached to the outside circumference of both ends of the hole member 14 in the axis direction. This attachment supports the hole member 14 rotatable about the axis, and restricts the movement in the axis direction.

The bearing 18 is fitly attached at its outside circumference to a center hole 23A of the base 23.

With this arrangement, the shaft 16 united with the hole member 14 is rotatable with respect to the base 23 through the bearing 18.

The scale 20 is formed on the circumference of shaft 16 coated with magnetic thin film with belt-shaped magnetized portions by a proper fine pitch in the axis direction.

The sensor 22 is nearly cylindrical, having the inside diameter slightly larger than the outside diameter of the shaft 16, and is disposed coaxial with the shaft 16, and adjacent to the hole member 14 at the projection side of the shaft 16.

The sensor 22, having within a primary coil and a plurality of secondary coils (not shown), is positioned close to the scale 20 at the inside circumference. The primary coil is provided coaxially at the near outer circumference of the sensor 22. The plural secondary coils are coaxially provided by a proper space in the axis direction at the inner side of the primary coil.

When the scale 20 moves in the axis direction relatively to the sensor 22, the primary coil and the secondary coils generate alternating current signals the phases of which are different each other. The detection of phase difference allows the sensor 22 to detect the position of the scale 20 in the axis direction.

A description will now be given of the action of the linear displacement detecting structure 10.

When the shaft 16 moves in the axis direction, the balls 34 roll between the U-shaped grooves 28 and 33, and circulate in the connecting holes 30A and 30B, and the receiving hole 32.

This circulation of balls allows the shaft 16 to smoothly move in the axis direction relatively to the shaft hole member 14.

As the shaft 16 moves in the axis direction, the scale 20 also moves the same, which causes the magnetized portion to move the same relatively to the sensor 22.

This relative movement allows the sensor 22 to detect the position of the scale 20 or the shaft 16 in the axis direction as electrical signals.

Since the scale 20 is directly provided on the circumference of shaft 16, the position of the scale 20 does not deviate from that of the shaft 16 in the axis direction, to thereby precisely detect the relative position between the shaft 16 and the hole member 14 in the axis direction.

The contact area 24 of the shaft 16 is restricted to the pair of U-shaped grooves 33, and the non-contact area 26 occupies the most part of the circumference of the shaft 16 except the grooves 33. Therefore, the area of the scale 20 can be made large enough to improve detecting sensitivity of the sensor 22.

Because the sensor 22 encloses the scale 20 in a cylindrical shape, the sensor 22 can accurately detect the position of the shaft 16 and scale 20 in the axis direction, irrespective of rotational phase of the shaft 16 and scale 20.

Further, the location of the scale 20 in the non-contact area 26 allows to prevent the scale 20 from its abrasion due to the slide in the hole member 14. This prevents the reduction of detecting precision due to time elapse.

That is, the detecting structure 20 has high reliability.

The sensor 22 can be disposed neighboring the hole member 14 because the scale 20 is inserted into the hole member 14. This disposal of sensor makes the detecting structure 10 shorter in the axis direction.

Further, the sensor 22 is disposed close to the scale 20 because of the direct formation of the scale 20 on the shaft 16, thereby making the detecting structure 10 smaller in the radial direction, too.

The shaft 16 is nearly a simple round bar while having small U-shaped grooves 33 on the circumference. Therefore, the magnetic substance can be easily coated, and hard to exfoliate.

Further, the magnetization of the coated magnetic substance is also easy.

That is, the fabrication of the scale 20 on the shaft 16 is easy and efficient in working, resulting in lower manufacturing cost of the detecting structure 10.

Additionally, the direct disposal of the scale 20 on the shaft 16 allows to eliminate a bracket and the like for attaching a scale to a shaft, leading to lower cost, lighter weight, and smaller size of the detecting structure 10.

Furthermore, the bearing 18 allows the shaft 16 to move in the axis direction, as well as to rotate about the axis. With this arrangement, the detecting structure 10 is applicable to various devices, such as an electronic component mounting head that will be explained hereunder, in which a shaft needs linear movement in the axis direction during rotation about the axis.

A description will now be given of a second embodiment of the invention.

Figure 4:
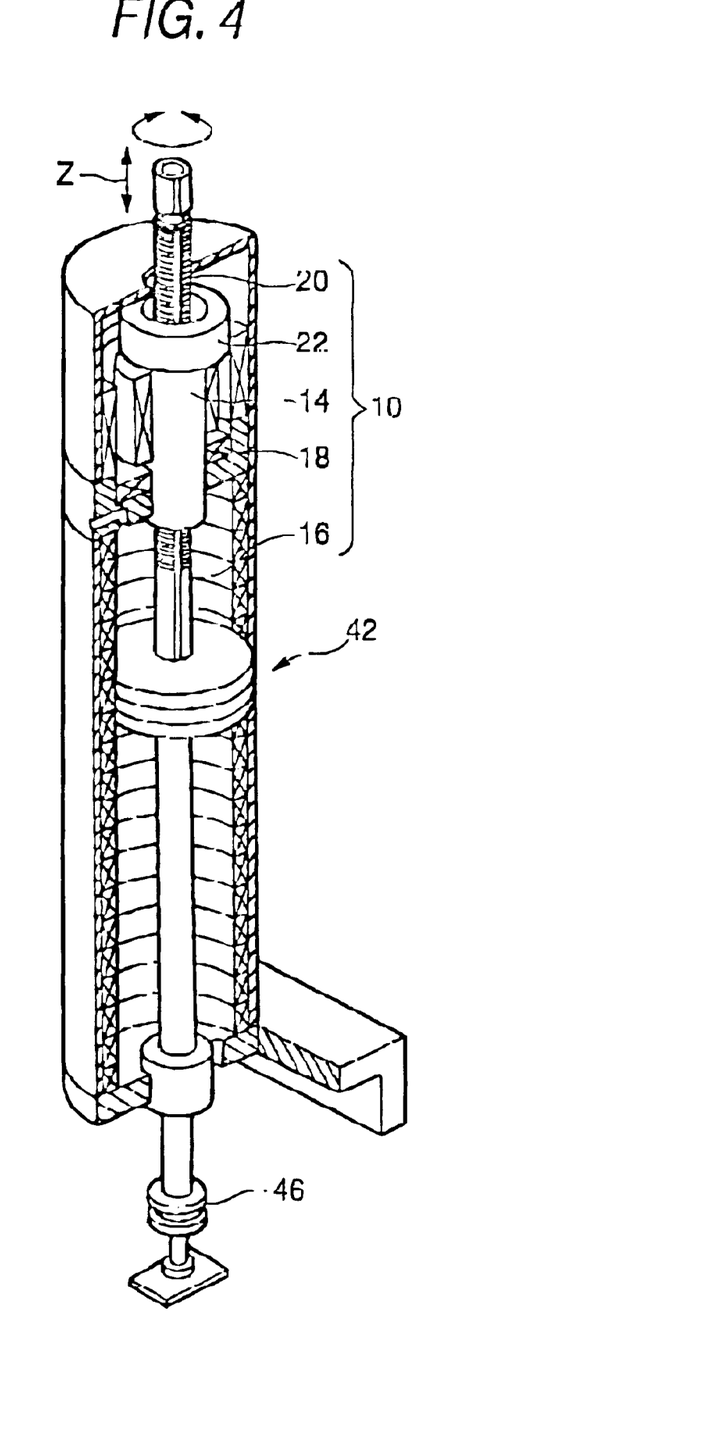
FIG. 4 is a perspective sectional view showing the construction of an electronic component mounting head according to a second embodiment of the invention.
Figure 5:
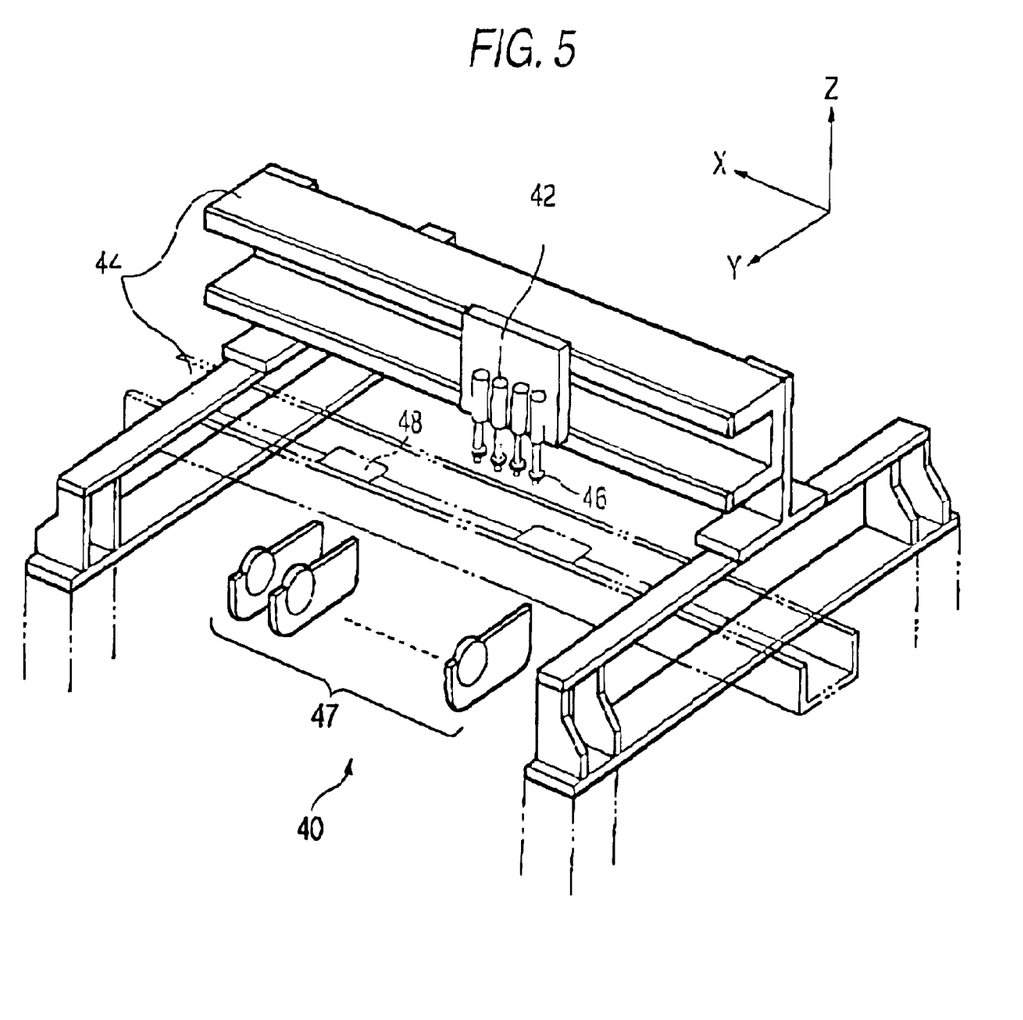
FIG. 5 is a perspective view showing the overall arrangement of an electronic component mounting machine having the component mounting heads.

In the second embodiment, the linear displacement detecting structure 10 is applied to an electronic component mounting head 42 for use in an electronic component mounting machine 40 as shown in FIGS. 4 and 5.

Wherein the detecting structure 10 is the same as in the first embodiment, and therefore like numerals of reference designate like parts and the description thereof is omitted.

Other portions except the detecting structure 10 belong to conventional art, and will be briefly explained for understanding the invention.

The mounting head 42 is installed on an X-Y driving mechanism 44 for moving in X-Y directions.

The head 42, installed in a Z direction, removably supports a vacuum nozzle 46 in a vicinity of the lower (top) end of the shaft 16, and moves the nozzle 46 in the Z direction with the rotation about its axis.

The shaft 16 is a hollow cylinder, and absorbing by the nozzle 46 a component stored in a component supply station 47 with a negative pressure supplied through the shaft 16, places the absorbed component onto a predetermined position on a printed circuit board 48.

Because the head 42 has the detecting structure 10, it is possible to precisely control the movement of shaft 16 or nozzle 46 in the Z direction, thereby achieve high reliability of component mounting operation.

Compactness of the head 42 helps to avoid interference with other elements during X-Y movement, and widen a scanning area in the X-Y directions.

Further, because of the compactness of the head 42, the X-Y driving mechanism 44 can accommodate thereon larger number of heads than conventional one, to thereby improve component mounting efficiency.

Figure 6:
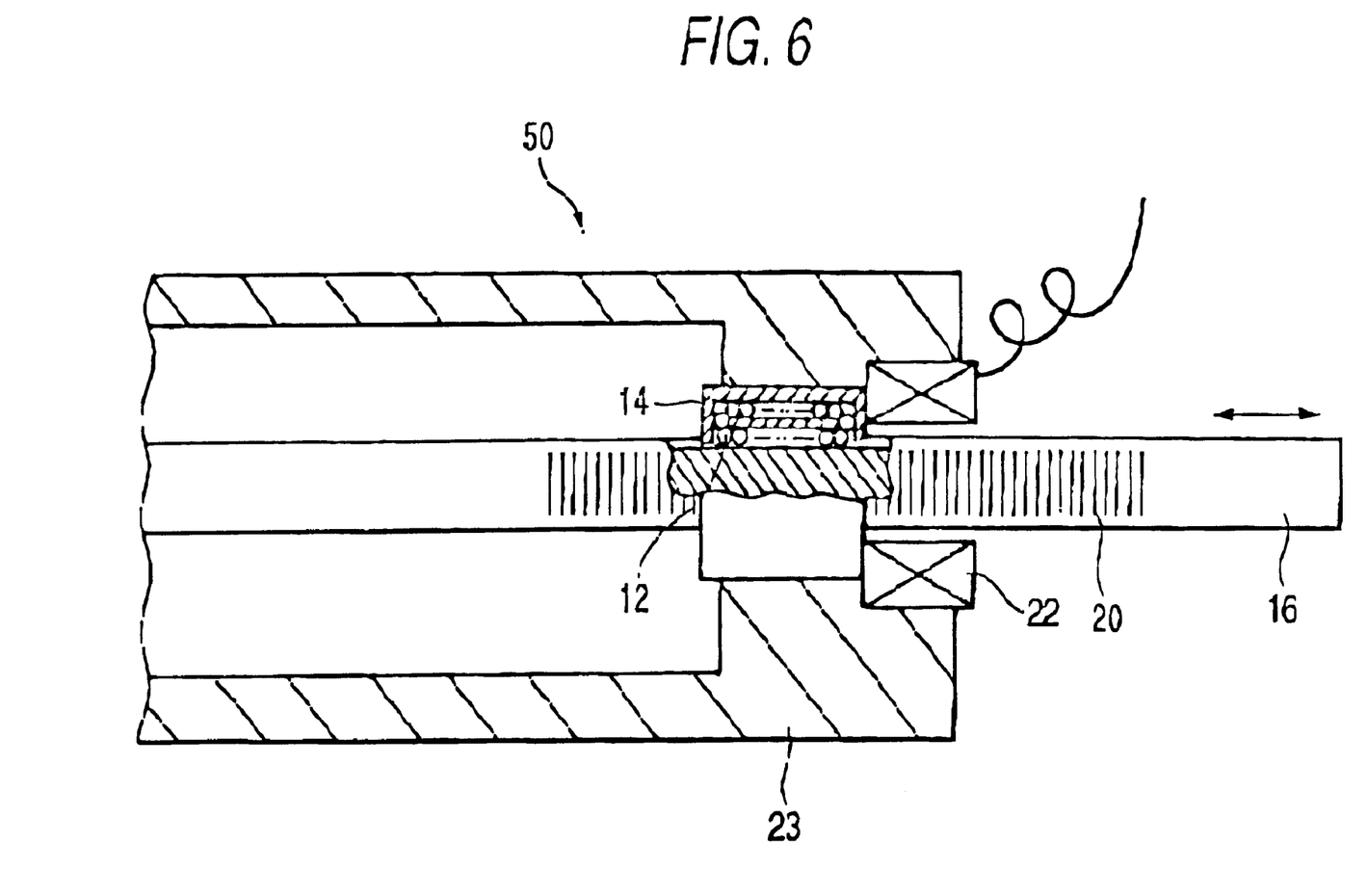
FIG. 6 is a side sectional view showing a linear displacement detecting structure according to a third embodiment of the invention.

In the first embodiment, the hole member 14 and the shaft 16 rotate about the axis by means of the bearing 18. However, if the shaft 16 does not need to be rotated about its axis, a linear displacement detecting structure 50 in a third embodiment is constructed as shown in FIG. 6, in which the hole member 14 can be fixed to the base 23 without the bearing 18.

In this case, neither the shaft 16 nor the scale 20 rotates, that is, the scale 20 moves in the axis direction only without rotation relative to the sensor 22.

Therefore, a sensor may be mounted close to a part of the circumference of the scale without enclosing it.

Further, the scale can be provided on a limited part of the circumference of the shaft, namely, a part of non-contact area.

Figure 7:
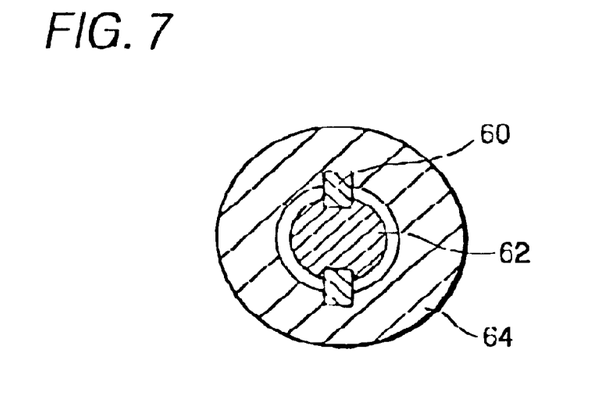
FIG. 7 is a sectional view showing the arrangement of a shaft member and a shaft hole member according to a fourth embodiment of the invention.

In the first to third embodiments described above, the shaft 16 indirectly fits in/contacts the hole member 14 through balls 34, but the invention is not limited to these embodiments. For example, as shown in a fourth embodiment of FIG. 7, a shaft 62 may indirectly fit in/contact a shaft hole member 64 through key members 60.

Figure 8:
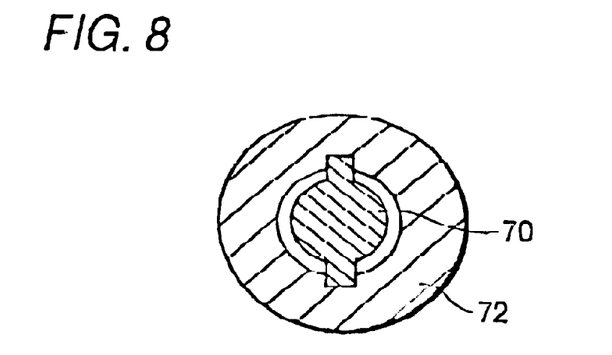
FIG. 8 is a sectional view showing the arrangement of a shaft member and a shaft hole member according to a fifth embodiment of the invention.

As another example, a shaft 70 may directly contact a shaft hole member 72 with spline fitting, as shown in a fifth embodiment of FIG. 8.

Figure 9:
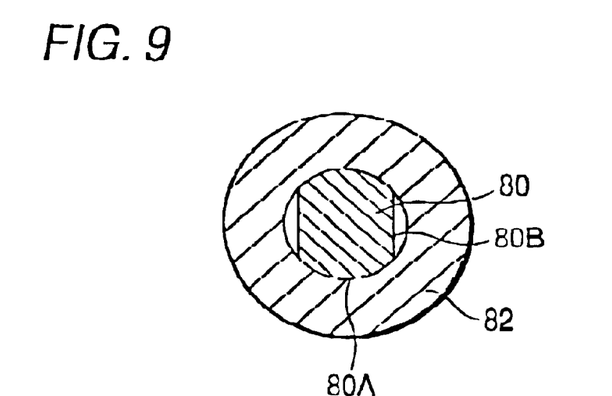
FIG. 9 is a sectional view showing the arrangement of a shaft member and a shaft hole member according to a sixth embodiment of the invention.

If relative phase or relative rotation between a shaft and a shaft hole member is not so critical, as shown in a sixth embodiment of FIG. 9, a part of the outer periphery of a shaft 80 may be formed to an arced portion 80A as a contact area, and the other part to a string-shaped portion 80B as a non-contact area. The arced portion 80A may fit in/contact a shaft hole ember 82, and a scale may be provided on the string-shaped portion 80B.

In the first to third embodiments, the scale 20 is formed by magnetized strips, but a scale may be formed, for example, in such manner that, using magnetic substance like iron as a shaft, non-magnetic material like copper can be plated in rings on the shaft in the axis direction by a proper pitch so as to alternately align a plurality of magnetic substance portions and non-magnetic material rings.

In this case, it is not necessary to magnetize the magnetic substance portions of the scale, thereby forming the scale easily in low cost.

As another modification, an optical sensor may detect a scale formed with a plurality of micro-grooves or micro-protrusions by a proper pitch in the axis direction.

As described above, the invention provides a linear displacement detecting structure which improves detecting precision in smaller size.

What is claimed is:

1. A linear displacement detecting structure comprising:
   a shaft hole member having a shaft hole formed thereon;
   a shaft member supported movably in its axis direction on the shaft hole member through the shaft hole;
   a scale moving with the shaft member united; and
   a sensor for detecting the scale to determine the relative position in the axis direction between the shaft member and the shaft hole member;

wherein the structure has a contact area where a part of the periphery of the shaft member fits in/contacts the shaft hole member directly or indirectly, and a non-contact area where the other part of the periphery is spaced apart from the shaft hole member, the scale being disposed in the non-contact area, and the sensor being disposed in the vicinity of the shaft hole member.

2. The detecting structure as claimed in claim 1, wherein the shaft member fits in the shaft hole member with a ball-spline mechanism.

3. The detecting structure as claimed in claim 1, the structure further comprising a bearing member for supporting the shaft hole member rotatable around its axis so as to rotate the shaft member united with the shaft hole member.

4. The detecting structure as claimed in claim 3, wherein the shaft member fits in the shaft hole member with a ball-spline mechanism.

5. An electronic component mounting head comprising:
a shaft hole member having a shaft hole formed thereon;
a cylindrical shaft member supported movably in its axis direction on the shaft hole member through the shaft hole and having a component pick-up nozzle at the near top end for absorbing the component;
a bearing member for supporting the shaft hole member rotatable around its axis so as to rotate the shaft member united with the shaft hole member;
a scale moving with the shaft member united; and
a sensor for detecting the scale to determine the relative position in the axis direction between the shaft member and the shaft hole member.

6. The mounting head as claimed in claim 5, wherein the shaft member fits in the shaft hole member with a ball-spline mechanism.

* * * * *